United States Patent
Kaku

Patent Number: 5,812,593
Date of Patent: Sep. 22, 1998

[54] DE-SPREAD CODE PHASE DETECTION APPARATUS IN SPREAD SPECTRUM TYPE RECEIVER

[75] Inventor: Tomoya Kaku, Tokyo, Japan

[73] Assignee: NEC Corporation, Tokyo, Japan

[21] Appl. No.: 575,579

[22] Filed: Dec. 20, 1995

[30] Foreign Application Priority Data

Dec. 22, 1994 [JP] Japan ................................ 6-336174

[51] Int. Cl.⁶ .................................................. H04J 13/02
[52] U.S. Cl. ........................... 375/208; 370/342; 370/491
[58] Field of Search ................................. 375/200, 205, 375/210, 354, 343, 356, 367; 370/319, 320, 335, 342, 441, 491, 500; 455/52.1, 52.3, 63, 65

[56] References Cited

U.S. PATENT DOCUMENTS

| | | | |
|---|---|---|---|
| 5,546,381 | 8/1996 | Fukushima | 370/479 |
| 5,550,811 | 8/1996 | Kaku et al. | 370/342 |
| 5,577,022 | 11/1996 | Padovani et al. | 370/335 |

*Primary Examiner*—Don N. Vo
*Assistant Examiner*—Amanda T. Le
*Attorney, Agent, or Firm*—Foley & Lardner

[57] ABSTRACT

A de-spread code phase detection apparatus and method in an SS receiver having a RAKE synthesizing demodulation function of receiving a pilot signal and a data signal, which have undergone spread spectrum modulation, is provided. The apparatus detects a plurality of different de-spread code phases used for demodulation by: performing de-spread processing of the pilot signal, separately performing de-spread demodulation of the data signal by using the plurality of de-spread code phases, performing predetermined weighting processing for the outputs upon phase matching, synthesizing the outputs, and outputting resultant data. The apparatus includes a search correlator, a search processing control section, and a search processing section. The search correlator obtains correlation results of the pilot signal and a de-spread code while sequentially changing the phase of the de-spread code. The search processing control section receives correlation results sequentially output from the search correlator and extracts peak value correlation results. The search processing section detects a plurality of de-spread code phases used for demodulation by obtaining a plurality of correlation results in decreasing order of value from the peak value correlation results extracted by the search processing control section.

6 Claims, 10 Drawing Sheets

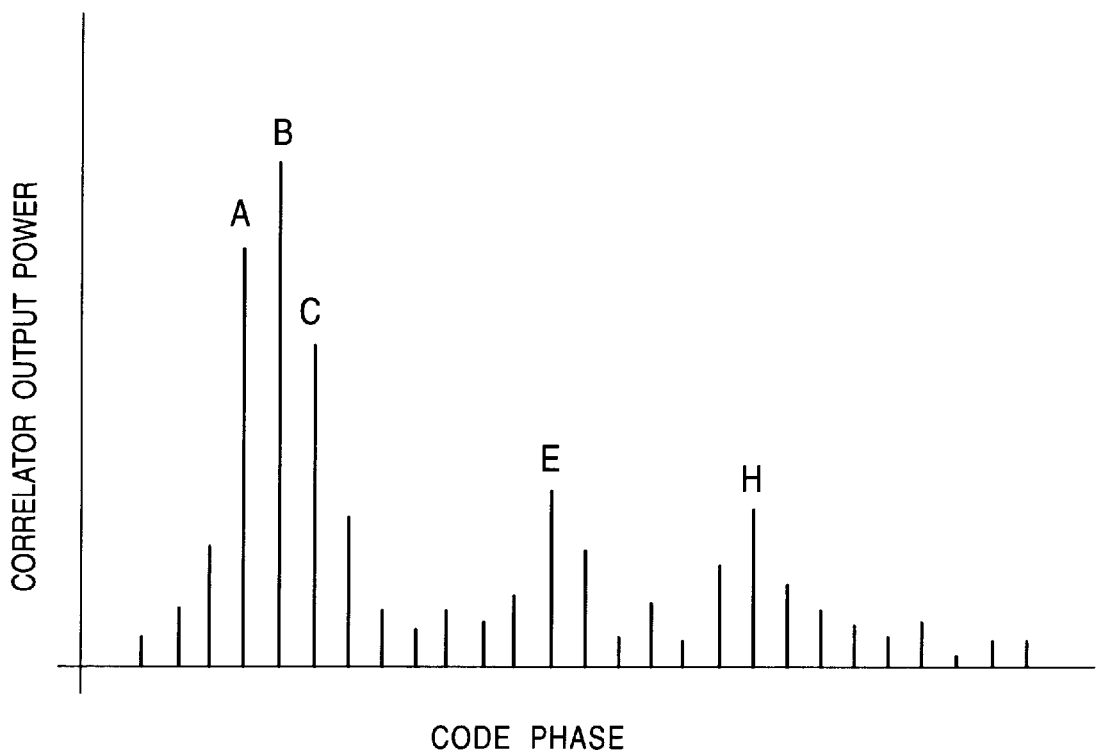

DE-SPREAD CODE PHASE DETECTION APPARATUS IN SPREAD SPECTRUM TYPE RECEIVER

BACKGROUND OF THE INVENTION

1. Field of the Invention

The present invention relates to a direct sequence spread spectrum (to be simply referred to as an SS hereinafter) communication system receiver and, more particularly, to a de-spread code phase detection apparatus for detecting a de-spread code phase used for demodulation.

2. Description of the Prior Art

It is important for an SS receiver to perform initial acquisition of a de-spread code phase used for demodulation and hold it thereafter. In order to facilitate such synchronous acquisition, or synchronous tracking, a digital cellular system of a CDMA scheme, standardized in July 1993 in North America (TIA.IS-95), uses a scheme of adding a pilot signal to a data signal and transmitting the resultant signal from a base station to a mobile station. A plurality of different base stations use the same frequency, and the phases of the spread codes of the pilot signals used among the respective base stations are shifted from each other by several tens to several millions, of chips, thereby allowing identification of each base station. Signals transmitted from different base stations can therefore be demodulated by changing the phase of a de-spread sequence to be multiplied by a correlation demodulator in a receiver. In addition, propagation delay path, variations of received power due to Rayleigh fading caused by movement of a receiver, and soft handoff (soft handover) like simultaneous reception from different base stations, can be realized when performing RAKE synthesizing demodulation, i.e., independently performing de-spread demodulation of data signals by using different de-spread code phases, performing phase matching of the resultant outputs, weighting the outputs with predetermined weighting factors, synthesizing the outputs, and outputting the resultant data.

FIGS. 1A and 1B are block diagrams respectively showing the arrangement of a general SS transmitter and the arrangement of a conventional SS receiver. An SS transmitter 1 includes an information modulator 2, a spread modulator 3, a spread code generator 4, a modulator 5, and an antenna 6 as the main components. A data signal (channel data signal), having undergone information modulation in the information modulator 2, and a spread code generated by the spread code generator 4 (corresponding to a mobile station as a communication target) are sent to the spread modulator 3. The spread modulator 3 multiplies these two signals to perform spread modulation thereof. Meanwhile, a signal consisting of an all "0" (or all "1") sequence having no information is spread-modulated as a pilot signal by using a known spread code (to be referred to as a PN hereinafter). The channel data signal and the pilot signal, which have undergone spread modulation in the above manner, are added together. The resultant signal is supplied to the next modulator 5 to be modulated. The modulated signal is then RF-amplified (Radio Frequency) and transmitted to the air through the antenna 6.

A conventional SS receiver 7 includes an antenna 8, a RF demodulator 9, an A/D converter 10, a de-spread demodulator 11, a synchronous acquisition tracking unit 12, and an information demodulator 13. Upon receiving a signal through the antenna 8, the SS receiver 7 demodulates the RF signal through the RF demodulator 9 and sends the demodulated signal to the A/D converter 10. The de-spread demodulator 11 and the synchronous acquisition tracking unit 12 are connected in parallel with the output of the A/D converter 10. First of all, in order to establish initial synchronization, a de-spread code phase PN' used for demodulation is extracted from a pilot signal contained in the output from the A/D converter 10. In this operation, the synchronous acquisition tracking unit 12 searches for a code phase by a sliding correlation method of multiplying the output from the A/D converter 10 by the same spread code PN as that used on the transmission side while sequentially changing the phase of the spread code PN at a predetermined window period, and obtaining the correlations between the resultant values. The phase of the pilot signal which provides the maximum correlation result in de-spread demodulation based on this sliding correlation method is determined as the synchronous phase PN'. With this operation, initial synchronization is established. After the establishment of the initial synchronization, the synchronous acquisition tracking unit 12 holds the synchronous phase PN' such that the corresponding correlation result will always be a maximum.

In order to obtain an accurate code phase in the above described synchronous acquisition and holding operation, the synchronous acquisition tracking unit 12 generally performs synchronous acquisition tracking within a resolution of ½ chip or less (e.g., ¼ chip). This is because a code having a large correlation (i.e., an auto-correlation function close to the δ function) like an M-sequence PN code is generally used as a spread code in an SS communication scheme, and even a shift corresponding to one chip will make the correlation value power output smaller than the maximum value by several tens dB or more. In practice, in search processing, the synchronous acquisition tracking unit 12 searches such spread codes having large auto-correlations for a code phase used for demodulation with a higher resolution (e.g., a precision of ¼ chip).

When only one de-spread code phase is to be used for demodulation, the synchronous acquisition tracking unit 12 may perform synchronous acquisition tracking to search for a code phase exhibiting the maximum correlation. However, in performing RAKE synthesizing demodulation, search processing is performed for the required number of code phases. When, for example, three de-spread code phases are to be used, search processing is performed for code phases exhibiting the first, second, and third strongest power values as the correlation results.

As described above, in the conventional SS receiver, the synchronous phase PN' used for demodulation is determined in accordance with the magnitudes of the power values as correlation results. If only one code phase is to be used, no problem is posed. If, however, a plurality of code phases are used for demodulation, as in RAKE synthesizing demodulation, it is highly probable that the second and subsequent largest code phases may be erroneously obtained. This will be described below.

FIG. 2 shows a delay profile indicating how the correlator output power changes upon switching of code phases. Referring to FIG. 2, the abscissa indicates the searched code phases; and the ordinate indicates the correlator output power values (correlation results) corresponding to the respective code phases. As described above, according to the prior art, since the first, second, and third strongest correlator output power values are obtained, the results sequentially correspond to points B, A, and C. However, the code phases to be obtained correspond to the points B, E, and H, respectively. This is because the points B, E, and H are the code phase points corresponding to the strong correlation results of signal components which have arrived at different timings, i.e. three signals that have different propagation paths. The points E and H correspond to the delay components of signals having the point B, and the points A and C correspond to portions of the auto-correlation functions of the signal components having the point B.

FIG. 3 shows a computer simulation result which is actually performed with respect to auto-correlation functions when the resolution in searching for a spread code used as a pilot signal is set to be ¼ chip in TIA.IS-95 described above. Let W be the auto-correlation output obtained when the phase of a received sequence (PN) is the same as that of a sequence (PN') used for correlation processing in a receiver, i.e., when there is no code phase shift. When the PN' shifted from the PN by ±¼ chip, the output was 3W/4 (about −1.3 dB:W). When the PN' shifted from the PN by ±½, the output was W/2 (about −3.0 dB:W). When the PN' shifted from the PN by ±¾ chip, the output was W/4 (about 6.0 dB:W). That is, sufficiently large results could be obtained as compared with the result (minus several tens to minus ten-odd dB: W) obtained when the PN' shifted from the PN by one or more chips. This improves the resolution in search processing. In the conventional method of obtaining a code phase used for demodulation in accordance with the magnitudes of the power values of correlator outputs, portions of the auto-correlation function occupy upper ranks in the magnitude order of the power values. As a result, these code phases may be used for demodulation.

In the above case, three different code phases are used for RAKE synthesizing demodulation. However, the number of code phases need not be limited. Although the above simulation describes results of spread codes used as pilot signals in the cellular telephone system of the CDMA scheme standardized in North America (TIA.IS-95) are described, the same results can be obtained by using other M-sequence PN codes and the like. In addition, the simulation shows the results obtained by performing calculation for all the correlations of spread codes (the correlations obtained by calculation correlations throughout the total length of one sequence). If, however, processing is performed by performing a partial correlation calculation of calculating a correlation with respect to a portion of the sequence, worse results are obtained. That is, the correlation output obtained when the code phase shift is one chip or more may become larger than the maximum output by −1.25 dB (in the above case, the shift is ±¼ chip). For reference, FIG. 4 shows the 1,024 chip partial correlation and 256 chip partial correlation of a spread code used in TIA.IS-95 (correlations are calculated throughout 1,024 chips and 256 chips, which are portions of the sequence whose total length corresponds to 32,768 chips).

As described above, in the conventional SS receiver, portions of a correlation function are searched out as code phases used for demodulation. After the search processing, it is difficult to check whether the obtained values are portions of a correlation function or signal components which have arrived at different timings. For this reason, code phases corresponding to the portions of the correlation function are often used for demodulation, resulting in a deterioration in the resolution of the demodulation result.

SUMMARY OF THE INVENTION

The present invention has been made in consideration of the above situation, and has as its object to accurately detect a plurality of de-spread code phases used for demodulation in an SS receiver having a RAKE synthesizing demodulation function of performing de-spread demodulation of a data signal by using a plurality of de-spread code phases.

In order to achieve the above object, according to the one aspect of the present invention, a de-spread code phase detection apparatus in an SS receiver, having a RAKE synthesizing demodulation function of receiving a pilot signal and a data signal, which have undergone spread spectrum modulation, detecting a plurality of different de-spread code phases used for demodulation by performing de-spread processing of the pilot signal, separately performing de-spread demodulation of the data signal by using the plurality of de-spread code phases, performing predetermined weighting processing for the outputs upon phase matching, synthesizing the outputs, and outputting the resultant data, comprises a search correlator for obtaining correlation results of the pilot signal and a de-spread code while sequentially changing a phase of the de-spread code, a search processing control section for receiving correlation results sequentially output from the search correlator and extracting a correlation result as a peak value, and a search processing section for detecting a plurality of de-spread code phases used for demodulation by obtaining a plurality of correlation results from the correlation results extracted by the search processing control section in the order of decreasing values.

In the above basic aspect, the search processing control section determines a correlation result as a peak value by comparing a correlation result output from the search correlator with immediately preceding and succeeding correlation results.

According to another aspect of the present invention, in addition to the arrangement of the above basic aspect, the apparatus further includes threshold setting means for setting a threshold on the basis of a correlation result output from the search correlator in the past, and wherein the search processing control section extracts a correlation result which exceeds the threshold set by the threshold setting means and is larger in value than preceding and succeeding correlation results.

As indicated by points B, E, and H in the delay profile in FIG. 2, the code phase points, of signal components having arrived at different timings, which have strong correlation results, become peak values on the shape of the delay profile. That is, each of the correlation results at the points B, E, and H is stronger than both the correlation results of the adjacent code phases. On the other hand, correlation results influenced by auto-correlation functions like those at points A and C do not become peak values. Such a correlation result is smaller than one of the correlation results of the adjacent code phases. The present invention is based on the shape of such a delay profile. The search processing control section receives correlation results sequentially output from the search correlator and extracts correlation results as peak values. The search processing section obtains a plurality of correlation results from the correlation results extracted by the search processing control section in the order of decreasing values. With this operation, a plurality of de-spread code phases used for demodulation are detected with high precision.

The above described and many other advantages, features and additional objects of the present invention will become manifest to those versed in the art upon making reference to the following detailed description and accompanying drawings in which preferred structural embodiments incorporating the principles of the present invention are shown by way of illustrating examples.

BRIEF DESCRIPTION OF THE DRAWINGS

FIG. 2 is a graph showing a delay profile indicating how the correlator output power changes upon a code phase switching operation;

DETAILED DESCRIPTION OF THE PREFERRED EMBODIMENTS

The present invention will be described in detail below with reference to several preferred embodiments shown in the accompanying drawings.

Figure 6:
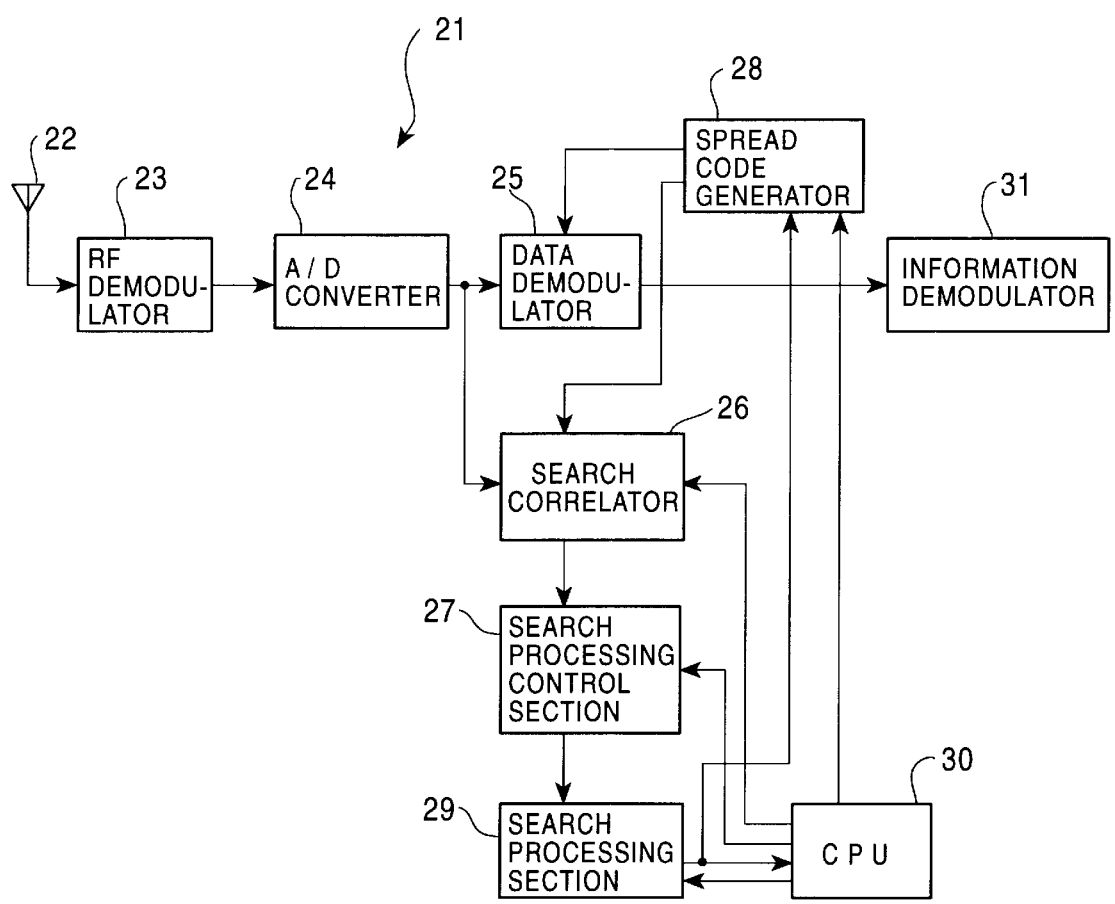
FIG. 6 is a block diagram showing the arrangement of an SS receiver to which an embodiment of the present invention is applied.

FIG. 6 is a block diagram showing the arrangement of an SS receiver to which the present invention is applied. An SS receiver 21 is used for a mobile station to receive a signal which is transmitted from a base station. The main components of the SS receiver 21 are an RF demodulator 23 connected to an antenna 22, an A/D converter 24 for A/D-converting an output from the RF demodulator 23, a data demodulator 25 and a search correlator 26, which are connected in parallel with the output of the A/D converter 24, a de-spread code generator (to be simply referred to as a code generator) 28 for generating a de-spread code used for de-spread processing in the data demodulator 25 and the search correlator 26, a search processing control section 27 for receiving correlation results output from the search correlator 26 and extracting a correlation result as a peak value, a search processing section 29 for searching for a plurality of code phases used for demodulation in accordance with the magnitude of the correlation result extracted by the search processing control section 27, a CPU 30 for controlling the search correlator 26, the search processing control section 27, the search processing section 29, and the code generator 28, and an information demodulator 31 for demodulating actual information output from the data demodulator 25.

In the SS receiver 21 in FIG. 6, when search processing for initial acquisition of a code phase used for demodulation is performed, the CPU 30 starts the code generator 28 upon supplying a code phase P(0) [phase ZERO] from which the search is to be started, a search range R [range], and a correlation integration time T [time] as information associated with the search to the code generator 28. In the search processing for initial acquisition, the entire range is designated as R. In response to this designation, the code generator 28 generates de-spread codes used for de-spread processing at predetermined time intervals while sequentially changing the code phase. Letting P(i) be the code phase to be generated, the code generator 28 generates a total of R code phases while changing the code phase from P(0) to P(R−1) a unit phase at a time.

The CPU 30 starts the search correlator 26 upon supplying the correlation integration time T thereto. In response to this, the search correlator 26 obtains the correlation between the output from the A/D converter 24 and the de-spread code corresponding to each of the code phases P(i) sequentially output from the code generator 28 for the time T, and sequentially outputs the correlation results to the search processing control section 27. Letting W(i) be the correlation results associated with the code phases P(i) generated by the code generator 28, the search correlator 26 outputs a total of R correlation results from W(0) to W(R−1).

The CPU 30 supplies the code phase P(0), from which the search is to be started, and the search range R to the search processing control section 27, and instructs the search processing control section 27 to start the search processing control. In addition, the CPU 30 instructs the search processing section 29 to start the search processing. The search processing control section 27 receives the correlation results W(i) sequentially output from the search correlator 26, extracts a correlation result as a peak value, and outputs it to the search processing section 29. The search processing section 29 detects a plurality of de-spread code phases used for demodulation by obtaining a plurality of correlation results of the correlation results output from the search processing control section 27 in order of decreasing value. The search processing section 29 then supplies the obtained de-spread code phases as de-spread code phases used for data demodulation to the code generator 28, and provides corresponding information to the CPU 30. The CPU 30 determines a search range R (narrower than the search range R in the initial acquisition) and an initial phase P(0) for synchronous tracking, and causes the above components to perform the same search processing as that described above in the narrower search range. By repeating such an operation, synchronous tracking is realized.

In performing de-spread demodulation of a data signal transmitted from the base station, the code generator 28 simultaneously generates a plurality of supplied de-spread code phases and outputs them to the data demodulator 25. The data demodulator 25 performs de-spread processing for the output from the A/D converter 24 and the plurality of de-spread code phases generated by the code generator 28 separately for one-symbol at a time, performs predetermined weighting processing for the resultant outputs after matching their phase timings, synthesizes the outputs, and outputs the resultant data to the information demodulator 31.

The search processing control section 27 and the search processing section 29 will be described in more detail below.

Figure 7:
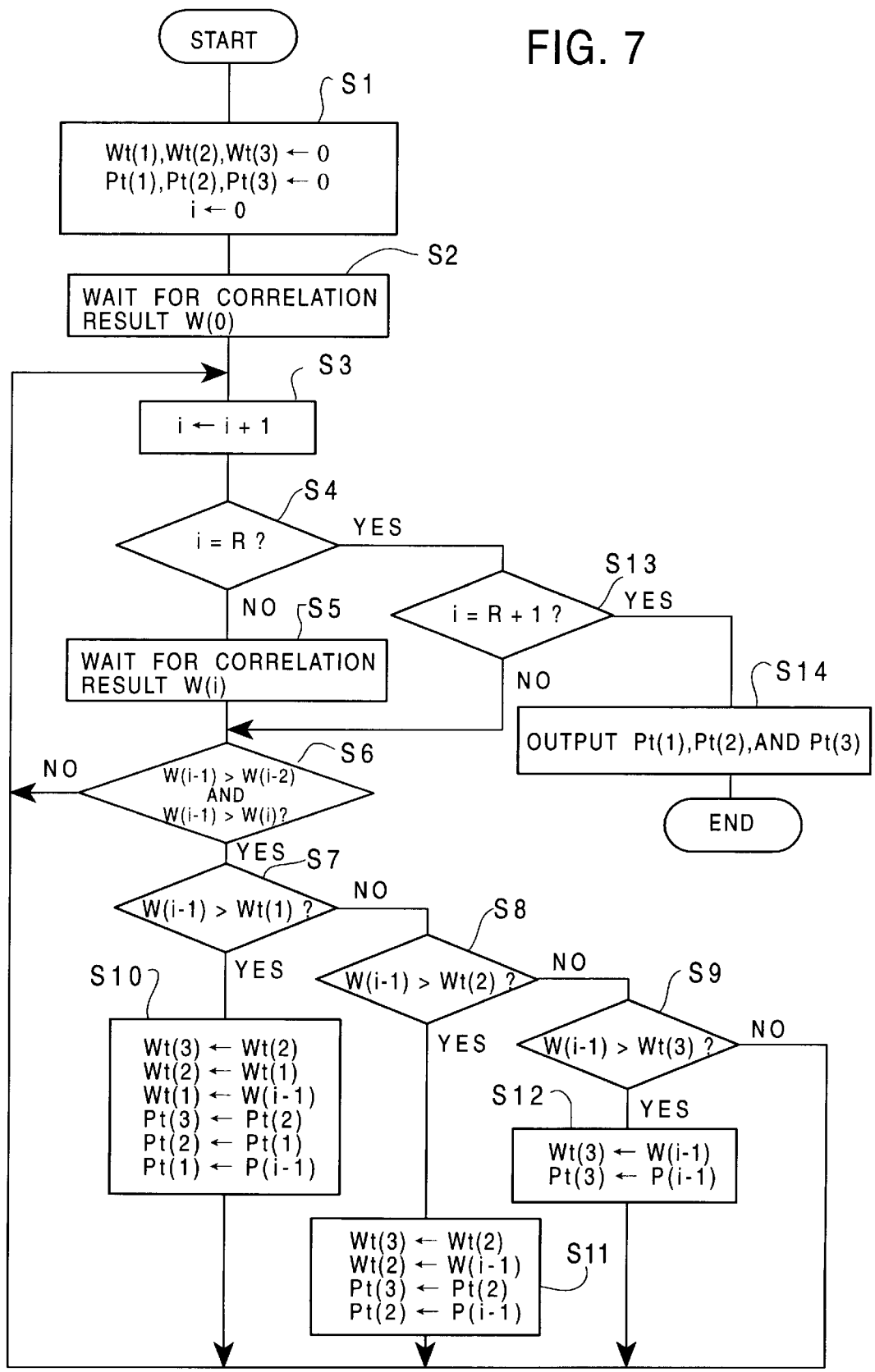
FIG. 7 is a flow chart showing an example of processing performed by a search processing control section and a search processing section in the SS receiver in FIG. 6.

FIG. 7 is a flow chart showing an example of processing performed by the search processing control section 27 and the search processing section 29 when three de-spread code phases used for demodulation are to be obtained. In response to an instruction to start search processing from the CPU 30, the search processing section 29 initializes internal variables Wt(1), Wt(2), and Wt(3) where Wt(1), Wt(2), and Wt(3) mean first, the second, and the third maximum strongest correlation results, respectively. And, Pt(1), Pt(2), and Pt(3) all set to 0, and the search processing control section 27 initializes a variable i to 0 (step S1).

The search processing control section 27 waits until the first correlation result W(0) is output from the search correlator 26 (step S2). When the correlation result W(0) is output, the search processing control section 27 increments the variable i by one to "1" (step S3), and waits until the next correlation result W(1) is output from the search correlator 26 (step S5). When the correlation result W(i) is output, it is checked whether the previously output correlation result W(0), i.e., W(i–1), i=1, is larger than both the immediately preceding correlation result W(i–2) thereof and the currently output correlation result W(i) (step S6). If i=1, since a correlation result W(–1) is not present, it is only checked whether the correlation result W(0) is larger than the correlation result W(1).

If YES in step S6, the previously output correlation result W(i–1) is output as the correlation result corresponding to the peak value to the search processing section 29, together with the corresponding code phase P(i–1). The flow then returns to step S3. If NO in step S6, since the previously output correlation result W(i–1) is not the peak value, the flow returns to step S3 without outputting it to the search processing section 29. In step S3, the variable i is incremented by one to "2" to wait for the next correlation result W(2) (step S5). Similar to the above case, when the correlation result W(2) is output, it is checked whether the previously output correlation result W(1) is larger than both the immediately preceding correlation result W(0) thereof and the currently output correlation result W(2) (step S6). If YES in step S6, the previously output correlation result W(1) is output as the correlation result corresponding to the peak value to the search processing section 29, together with the corresponding code phase P(1). The flow then returns to step S3. If NO in step S6, the flow immediately returns to step S3. The search processing control section 27 repeats the above operation until the last correlation result W(R–1) is output from the search correlator 26. When i=R after the variable i is incremented by one in step S3, the flow advances from step S4 to step S6 via step S13. In this case, since a correlation result W(R)=W(i) is not present, it is only checked in step S6 whether the correlation result W(R–1) is larger than its immediately preceding correlation result W(R–2). If YES in step S6, the correlation result W(R–1) is output as the peak value to the search processing section 29, together with the corresponding code phase P(R–1). The flow then returns to step S3. If NO in step S6, the flow immediately returns to step S3. When the variable i is incremented by one in step S3, i=R+1. The search processing control section 27 therefore terminates this processing after steps S4 and S13.

Meanwhile, every time the search processing section 29 receives the correlation result W(i–1) as the peak value and the corresponding code phase P(i–1) from the search processing control section 27, the search processing section 29 checks first whether the correlation result W(i–1) is stronger than the internal variable Wt(1) (step S7). If YES in step S7, the search processing section 29 shifts the contents of the internal variable Wt(1) to the internal variable Wt(2), and the contents of the internal variable Wt(1) to the internal variable Wt(2). Thereafter, the search processing section 29 stores the current correlation result W(i–1) in the internal variable Wt(1). In addition, the search processing section 29 shifts the contents of the internal variable Pt(2) to the internal variable Pt(3); and the contents of the internal variable Pt(1) to the internal variable Pt(2). Thereafter, the search processing section 29 stores the current code phase P(i–1) in the internal variable Pt(1) (step S10).

If the correlation result W(i–1) is not stronger than the internal variable Wt(1), it is checked whether the correlation result W(i–1) is stronger than the next internal variable Wt(2) (step S8). If YES in step S8, the search processing section 29 shifts the contents of the internal variable Wt(2) to the internal variable Wt(3), and stores the current correlation result W(i–1) in the internal variable Wt(2). In addition, the search processing section 29 shifts the contents of the internal variable Pt(2) to the internal variable Pt(3), and stores the current code phase P(i–1) in the internal variable Pt(2) (step S11).

If the correlation result W(i–1) is not stronger than the internal variable Wt(2), it is checked whether the correlation result W(i–1) is stronger than the next internal variable Wt(3) (step S9). If YES in step S9, the search processing section 29 stores the current correlation result W(i–1) in the internal variable Wt(3), and also stores the current code phase P(i–1) in the internal variable Pt(3) (step S12).

If the current correlation result W(i–1) is not stronger than the internal variable Wt(3), the internal variables Wt(1) to Wt(3) and Pt(1) to Pt(3) are not updated, i.e., W(i–1) is smaller than the max. 3.

When the above processing is performed for all the correlation results as the peak values output from the search processing control section 27, the three upper correlation results having large values of the correlation results extracted by the search processing control section 27 are stored in the internal variables Wt(1), Wt(2), and Wt(3), respectively, in order of decreasing value, and a plurality of de-spread code phases used for demodulation are respectively stored in the internal variables Pt(1), Pt(2), and Pt(3). The search processing section 29 outputs the plurality of de-spread code phases stored in the internal variables Pt(1), Pt(2), and Pt(3) and used for demodulation to the code generator 28 and the CPU 30 (step S14)

Figure 1A:
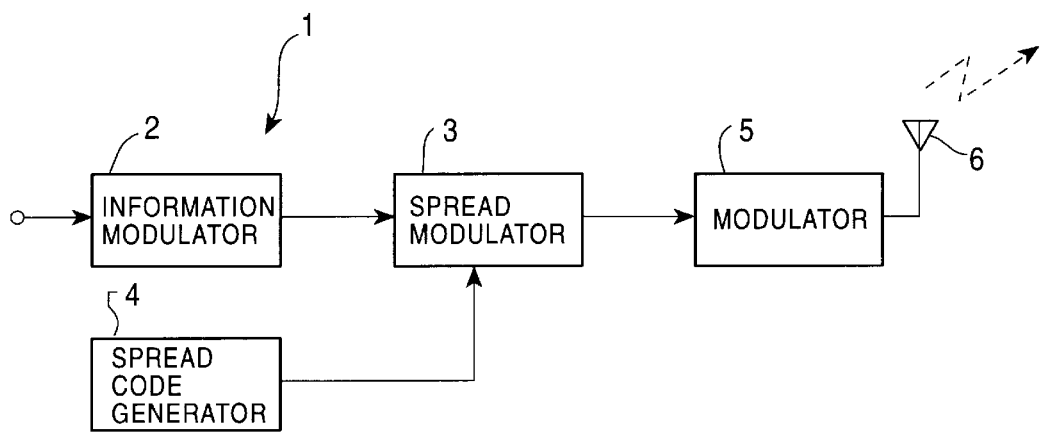
FIGS. 1A and 1B are block diagrams respectively showing the arrangements of a general SS transmitter and the arrangement of a conventional SS receiver.
Figure 1B:
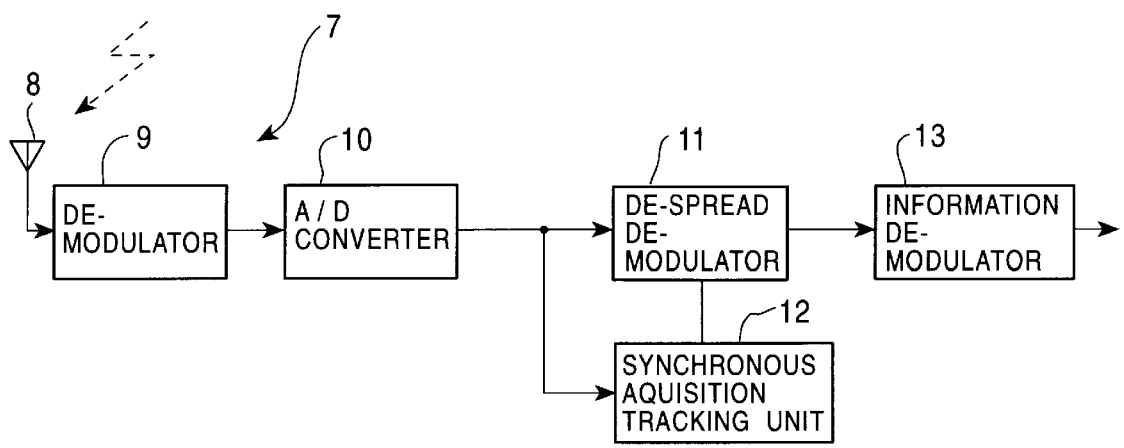
Figure 3:
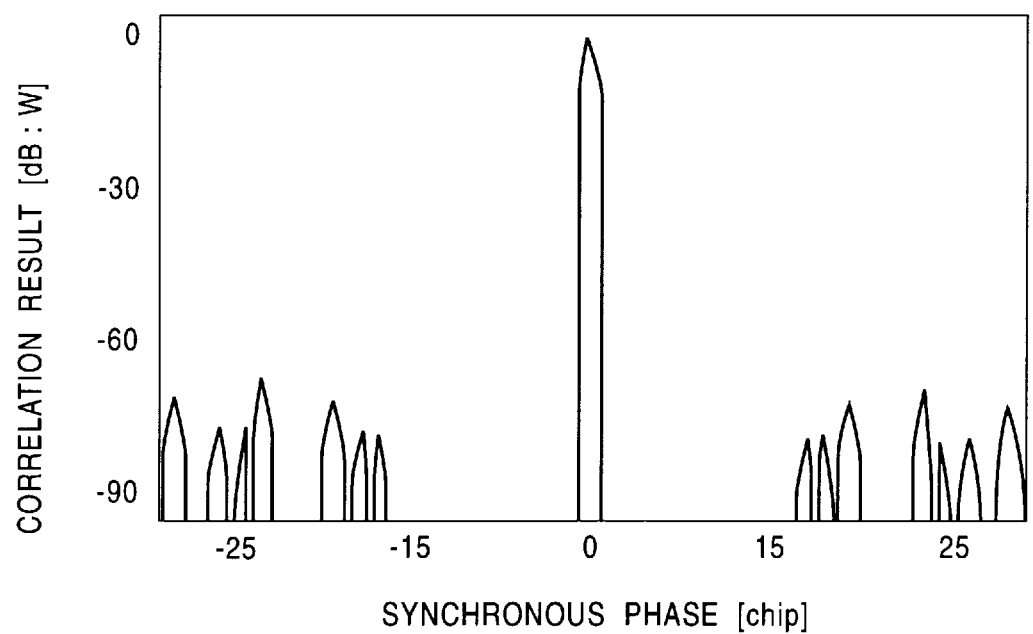
FIG. 3 is a graph showing a computer simulation result of an auto-correlation function throughout the entire length of a spread code sequence used as a pilot signal in a cellular telephone system of a CDMA scheme (TIA.IS-95)
Figure 4:
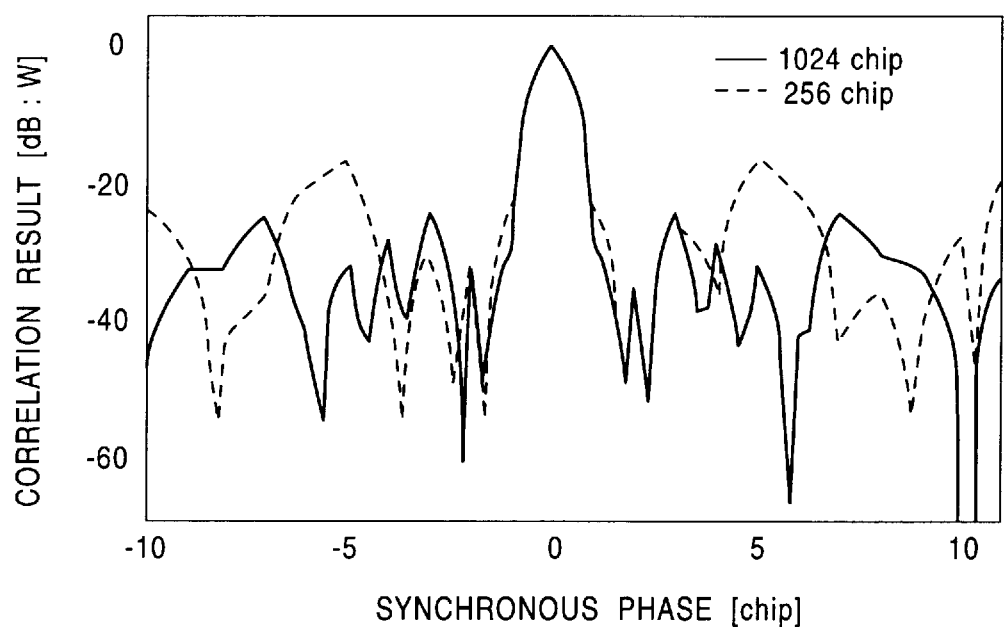
FIG. 4 is a graph showing a computer simulation result of auto-correlation functions throughout 1,024 chips and 256 chips of a spread code used as a pilot signal in the cellular telephone system of the CDMA scheme (TIA.IS-95)
Figure 5:
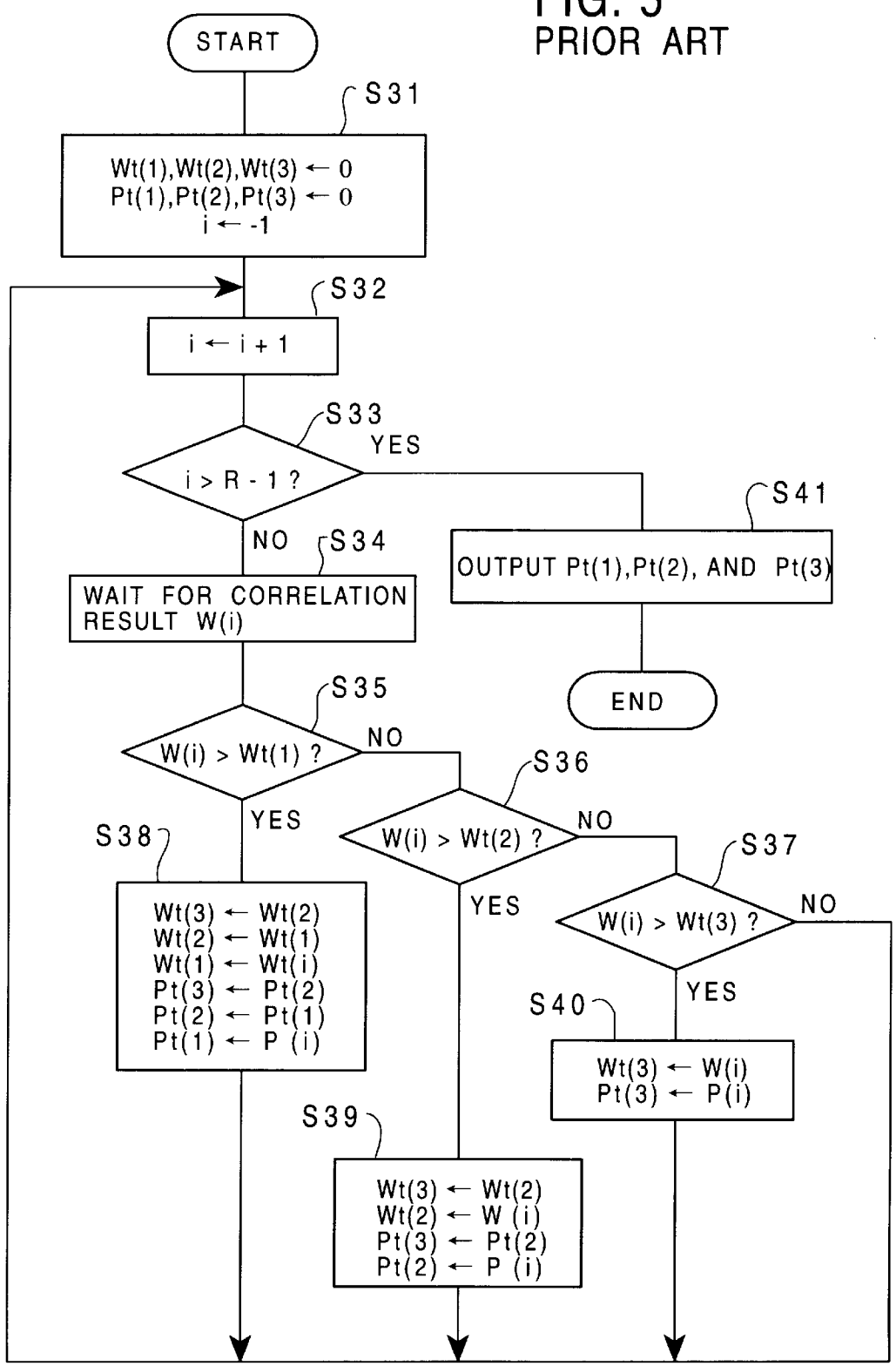
FIG. 5 is a flow chart showing an example of search processing of de-spread code phases in the SS receiver in FIG. 1B.

For comparison, FIG. 5 shows a flow chart showing processing performed by the synchronous acquisition tracking unit 12 of the conventional SS receiver 7 to obtain three de-spread code phases used for demodulation. As shown in FIG. 5, in the prior art, every time the correlation result W(i) between the de-spread code of the code phase P(i) and an output from the A/D converter 10 is obtained, steps S35 to S40, similar to steps S7 to S12 in FIG. 7, are executed.

Figure 8:
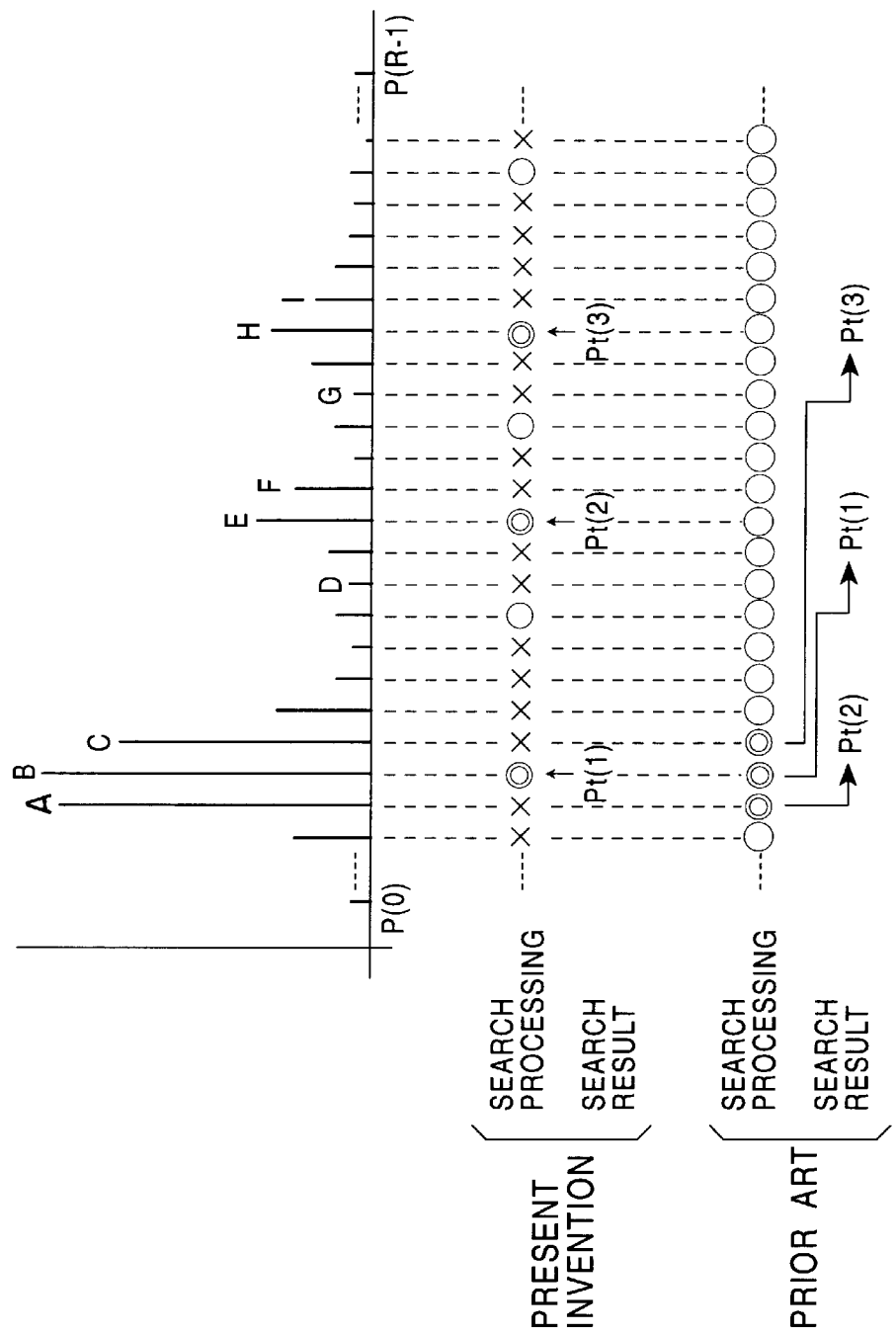
FIG. 8 is a graph showing the manners of executing search processing in the present invention and the prior art in the process of obtaining de-spread code phases used for demodulation, and the search results.

FIG. 8 shows the manner of executing search processing in the present invention and in the prior art for the process of obtaining the three code phases Pt(1) to Pt(3) (corresponding to the processing in steps S7 to S12 in FIG. 7 in the embodiment of the present invention, and the processing in steps S35 to S40 in FIG. 5 in the prior art) and the search results with reference to the delay profile in FIG. 2. Referring to FIG. 8, "○" and "⊙" indicate code phases having undergone search processing. More specifically, "⊙" indicates a code phase as a finally obtained search result. In addition, "x" indicates a code phase which has not undergone search processing.

As shown in FIG. 8, according to the prior art, all the phase codes within the search range undergo search processing, and points B, A, and C are detected as code phases used for demodulation in the order of decreasing correlation results. This is because in the prior art, correlation results as code phases output from the correlator are processed as independent points. In contrast to this, in the above embodiment of the present invention, the search processing control section 27 extracts a correlation result as a peak value, and the search processing section 29 performs search processing only for this extracted correlation result. Since code phases as portions of the auto-correlation function of the code phase B, such as the code phases A and C, which are extracted as search results in the prior art and, are not peak values, these code phases are not subjected to search processing. With this operation, search processing is performed for only the code phases which do not contain portions of the auto-correlation function of a given spread code. As a result, the points B, E, and H are detected as code phases to be used for demodulation.

As is apparent from the number of "X"s in FIG. 8, in this embodiment, the majority of the correlation results of all the code phases in the search range are not peak values and hence are not subjected to search processing, unlike the prior art in which all the code phases in the search range are subjected to search processing. Therefore, even in consideration of an increase in the amount of processing performed by the search processing control section 27, the total processing amount can be reduced, leading to a reduction in the overall power consumption of the receiver.

Figure 9:
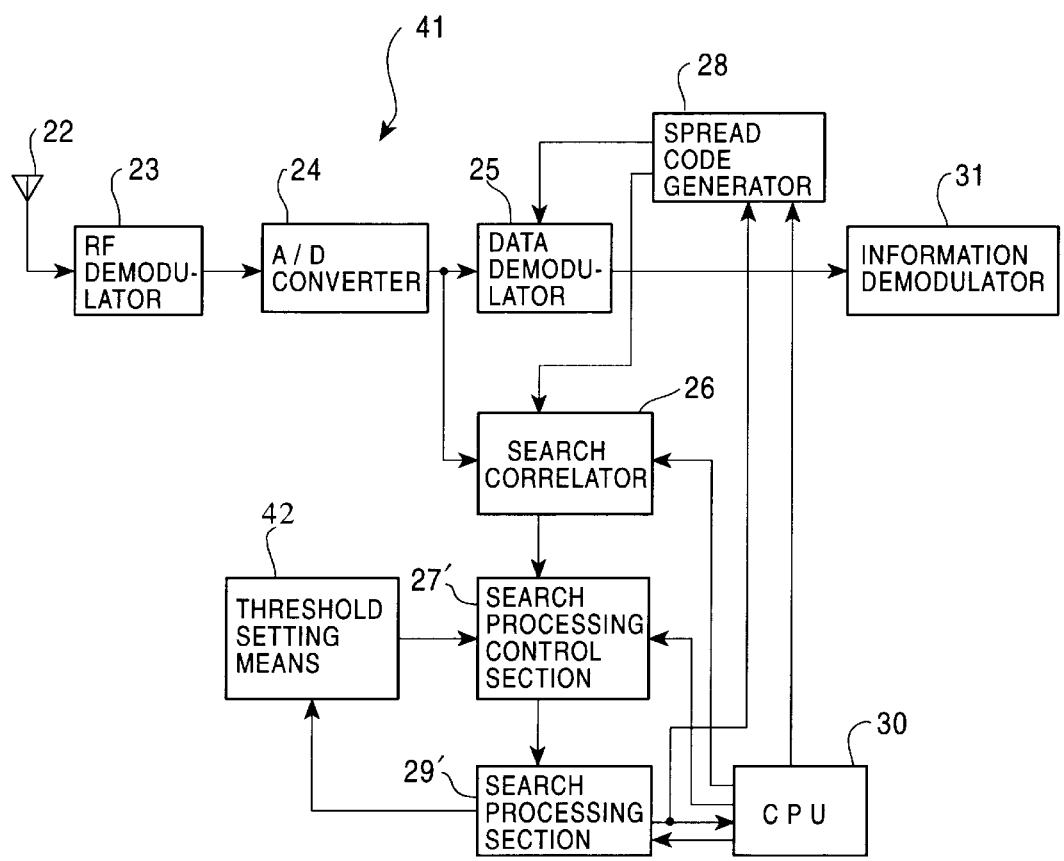
FIG. 9 is a block diagram showing the arrangement of another SS receiver to which an embodiment of the present invention is applied.
Figure 10:
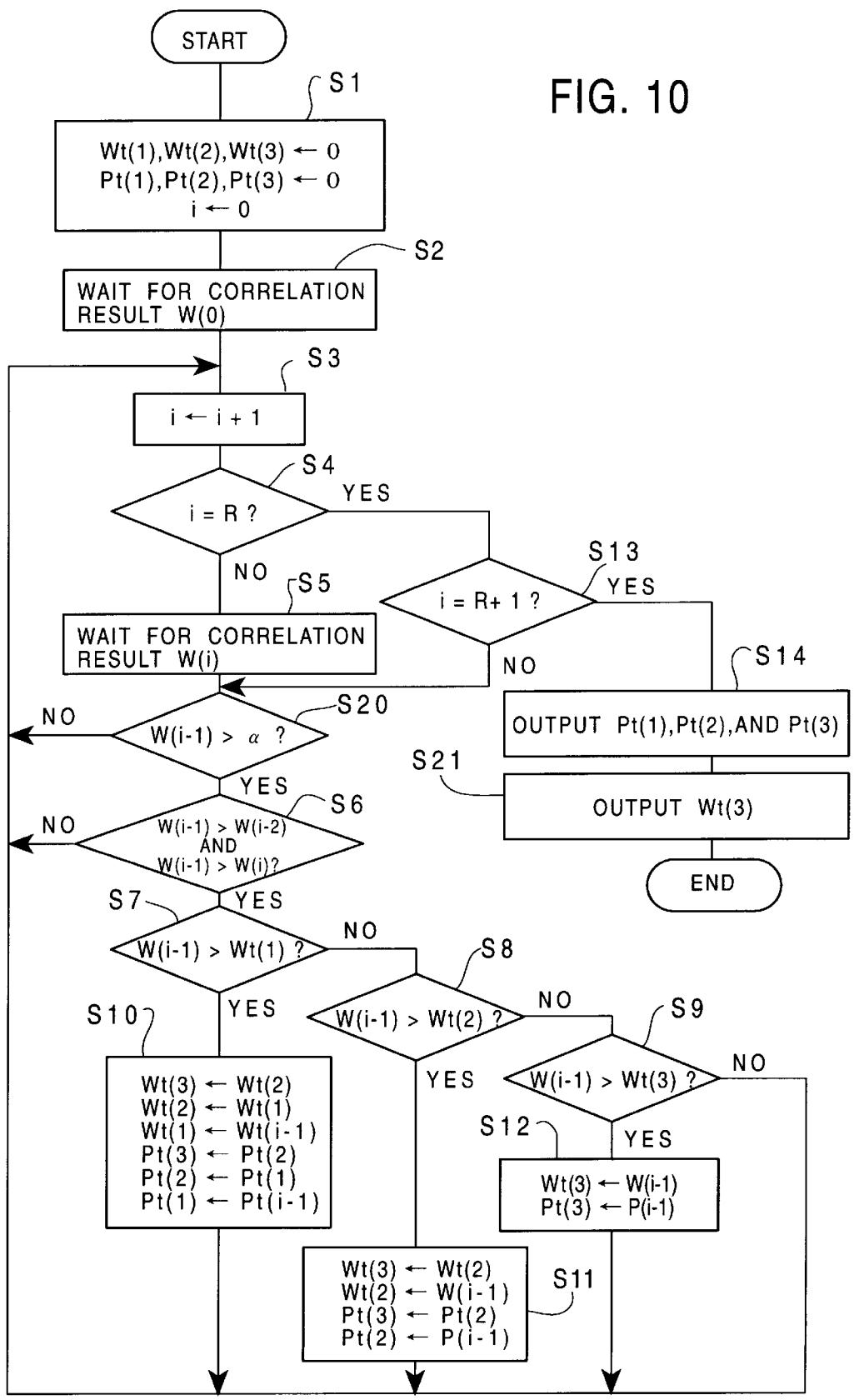
FIG. 10 is a flow chart showing an example of processing performed by a search processing control section and a search processing section in the SS receiver in FIG. 9.

FIG. 9 is a block diagram showing another SS receiver to which the present invention is applied. The same reference numerals in FIG. 9 denote the same parts as in FIG. 6B. Reference numeral 27' denotes a search processing control section; 29', a search processing section; 41, an SS receiver; and 42, a threshold setting means. FIG. 10 is a flow chart showing an example of processing performed by the search processing control section 27' and the search processing section 29' when three de-spread code phases used for demodulation are to be obtained. This flow chart is different from that in FIG. 7 in that step S20 is added between steps S5 and S6, and step S21 is added after step S14.

In the embodiment shown in FIG. 9, when the search processing section 29' obtains search results, a minimum correlation result Wt(3) of three correlation results Wt(1), Wt(2), and Wt(3), obtained by the current search processing, is output to the threshold setting means 42 (step S21). The threshold setting means 42 obtains a threshold α used for the next search processing control performed by a search processing control section 26' from this correlation result Wt(3). Assume that half the correlation result Wt(3) is set to be the threshold α. As shown in FIG. 10, when the correlation result W(i) is obtained from the search correlator 26, the search processing control section 27' compares a previously obtained correlation result W(i−1) with the threshold α set by the threshold setting means 42 (step S20) before the processing in step S6 in which the previously obtained correlation result W(i−1) is compared with immediately preceding and succeeding correlation results W(i−2) and W(i) thereof. If the correlation result W(i−1) is larger than the threshold α, the flow advances to step S6. With this operation, only a correlation result which exceeds a given threshold and becomes a peak value is output to the search processing section 29', thereby further reducing the overall processing amount and realizing low power consumption.

In the above case, the threshold a is set on the basis of the minimum correlation result Wt(3) of the three correlation results Wt(1), Wt(2), and Wt(3) obtained by search processing. However, a threshold may be set on the basis of another correlation result or a plurality of correlation results. Alternatively, a threshold may be systematically determined from all correlation results. Also, a threshold can be set in consideration of the results of search processing performed several times in the past.

The above embodiment has exemplified the case wherein three de-spread code phases used for demodulation are obtained. However, the number of de-spread code phases is not limited to three, and the same effects as described above can be obtained as long as a plurality of de-spread code phases are obtained.

As has been described above, according to the present invention, from correlation results sequentially output from the search correlator, a correlation result larger than the correlation results of the adjacent code phases is extracted as a peak value correlation result. A plurality of correlation results are obtained from correlation results extracted in this manner in the order of decreasing values, thereby detecting a plurality of de-spread code phases used for demodulation. With this operation, of signal components in a received signal which have arrived at different timings, signal components having large power values can be searched out. This can improve the precision of a demodulation result.

In addition, since the majority of the correlation results of all code phases cannot be peak values, the number of correlation results processed by the search processing section can be greatly reduced. Therefore, even in consideration of an increase in the amount of processing performed by the search processing control section, the total processing amount can be reduced, leading to a reduction in the overall power consumption of the receiver.

According to the arrangement which has a threshold setting means for setting a threshold on the basis of a previously extracted correlation result, designed to extract a correlation result which exceeds this threshold and is larger than the preceding and succeeding output correlation results, and causes the search processing section to process the extracted correlation result, even further reductions in overall processing amount and power consumption can be attained.

What is claimed is:

1. A de-spread code phase detection apparatus in a spread spectrum receiver having a RAKE synthesizing demodulation function of receiving a pilot signal and a data signals, which have undergone spread spectrum modulation, detecting a plurality of different de-spread code phases used for demodulation by performing de-spread processing of the pilot signal, separately performing de-spread demodulation of the data signal by using the plurality of de-spread code phases, performing predetermined weighting processing for outputs obtained from said de-spread processing upon phase matching, synthesizing outputs obtained from said weighting processing, and outputting resultant data, comprising:

a search correlator for obtaining correlation results of the pilot signal and a de-spread code while sequentially changing a phase of the de-spread code;

a search processing control section for receiving said correlation results sequentially output from said search correlator and extracting peak value correlation results; and a search processing section for detecting the plurality of de-spread code phases used for demodulation by performing search processing for the extracted peak value correlation results, wherein said search processing section obtains a plurality of correlation results in order of decreasing value from the extracted peak value correlation results and outputs the plurality of de-spread code phases.

2. An apparatus according to claim 1, wherein said search processing control section extracts the peak value correlation results by comparing a correlation result output from said search correlator with immediately preceding and succeeding correlation results.

3. An apparatus according to claim 2, further comprising threshold setting means for setting a threshold on the basis of a predetermined correlation result output from said search correlator, and wherein said search processing control section extracts a correlation result which exceeds the threshold set by said threshold setting means and is larger in value than preceding and succeeding correlation results.

4. A method of de-spread code phase detection for use in a spread spectrum receiver having a RAKE synthesizing demodulation function, comprising the steps of:

receiving a pilot signal and a data signal which have undergone spread spectrum modulation;

first detecting a plurality of different de-spread code phases used for demodulation by performing de-spread processing of said pilot signal and providing outputs;

obtaining a plurality of correlation results of the pilot signal and a de-spread code while sequentially changing a phase of the de-spread code;

extracting peak value correlation results from the obtained plurality of correlation results; and performing a search processing for only the extracted peak value correlation results and second detecting a plurality of de-spread code phases used for demodulation of the data signal.

5. The method according to claim 4, wherein said extracting step further comprises the step of comparing a correlation result obtained from said obtaining step with immediately preceding and succeeding obtained correlation results.

6. The method according to claim 5, further comprising the steps of:

setting a threshold value on the basis of a predetermined obtained correlation result; and extracting a peak value correlation result which exceeds the threshold value and that is larger in value than preceding and succeeding obtained correlation results.

\* \* \* \* \*